United States Patent
Armstrong et al.

(10) Patent No.: US 8,364,879 B2
(45) Date of Patent: Jan. 29, 2013

(54) HIERARCHICAL TO PHYSICAL MEMORY MAPPED INPUT/OUTPUT TRANSLATION

(75) Inventors: William J. Armstrong, Rochester, MN (US); Scott N. Dunham, Raleigh, NC (US); David R. Engebretsen, Cannon Falls, MN (US); Gregory M. Nordstrom, Pine Island, MN (US); Steven M. Thurber, Austin, TX (US); Curtis C. Wollbrink, Rochester, MN (US); Adalberto G. Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/758,256

(22) Filed: Apr. 12, 2010

(65) Prior Publication Data

US 2011/0252174 A1    Oct. 13, 2011

(51) Int. Cl.
*G06F 13/36*    (2006.01)
(52) U.S. Cl. ......... 710/306; 710/305; 710/316; 711/104
(58) Field of Classification Search .......... 710/305–306, 710/240–244, 316–317; 711/104
See application file for complete search history.

(56) References Cited

U.S. PATENT DOCUMENTS

| | | | |
|---|---|---|---|
| 7,506,084 B2 | 3/2009 | Moerti et al. | |
| 7,587,575 B2 | 9/2009 | Moertl et al. | |
| 7,590,817 B2 | 9/2009 | Moertl et al. | |
| 7,600,093 B2 | 10/2009 | Ben-Yehuda et al. | |
| 7,689,755 B2 * | 3/2010 | Balasubramanian et al. | 710/311 |
| 2006/0161709 A1 * | 7/2006 | Davies | 710/268 |
| 2006/0195617 A1 | 8/2006 | Arndt et al. | |
| 2006/0195623 A1 | 8/2006 | Arndt et al. | |
| 2007/0061549 A1 | 3/2007 | Kaniyur et al. | |
| 2007/0067505 A1 | 3/2007 | Kaniyur et al. | |
| 2007/0300241 A1 | 12/2007 | Prakash et al. | |
| 2009/0037614 A1 | 2/2009 | Saripalli | |
| 2009/0089464 A1 | 4/2009 | Lach et al. | |
| 2009/0133016 A1 | 5/2009 | Brown et al. | |
| 2009/0133028 A1 | 5/2009 | Brown et al. | |
| 2009/0144731 A1 | 6/2009 | Brown et al. | |

OTHER PUBLICATIONS

IBM Patent Application entitled "Hierarchical to Physical Bus Translation" filed by William J. Armstrong et al. on Apr. 12, 2010.
IBM Patent Application entitled "Physical to Hierarchical Bus Translation" filed by William J. Armstrong et al. on Apr. 12, 2010.
IBM Patent Application entitled "Translating a Requester Identifier to a Chip Identifier" filed by William J. Armstrong et al. on Apr. 12, 2010.

* cited by examiner

*Primary Examiner* — Brian Misiura
*Assistant Examiner* — Kim Huynh
(74) *Attorney, Agent, or Firm* — Owen J. Gamon (57) ABSTRACT

In an embodiment, a translation of a hierarchical MMIO address range to a physical MMIO address range and an identifier of a bridge in a south chip are written to a north chip. A transaction is received that comprises a hierarchical MMIO address. The hierarchical MMIO address that is within the hierarchical MMIO address range is replaced in the transaction with the identifier of the bridge and with a physical MMIO address that is within the physical MMIO address range in the south chip. The transaction is sent to the device that is connected to the bridge in the south chip. The physical MMIO address range specifies a range of physical MMIO addresses in memory in the device.

20 Claims, 6 Drawing Sheets

MMIO TRANSLATION TABLE 145-1

| HIERARCHICAL MMIO ADDRESS RANGE (409) | PHYSICAL MMIO ADDRESS RANGE (410) | SOUTH CHIP ID (411) | |
|---|---|---|---|
| 0X0000-0X0FFF | 0X4000 - 0X4FFF | SOUTH CHIP A PTP A | 401 |
| 0X1000-0X1FFF | 0X5000 - 0X5FFF | SOUTH CHIP A PTP B | 402 |
| 0X2000-0X2FFF | 0X6000 - 0X6FFF | SOUTH CHIP A PTP C | 403 |
| 0X3000-0X3FFF | 0X7000 - 0X7FFF | SOUTH CHIP B PTP D | 404 |

FIG. 4

MMIO TRANSLATION TABLE 145-2

| HIERARCHICAL MMIO ADDRESS RANGE (509) | PHYSICAL MMIO ADDRESS RANGE (510) | SOUTH CHIP ID (511) | |
|---|---|---|---|
| 0X0000 - 0X0FFF | 0X7000 - 0X7FFF | SOUTH CHIP B PTP D | 501 |
| 0X1000 - 0X1FFF | 0X8000 - 0X8FFF | SOUTH CHIP B PTP E | 502 |
| 0X2000 - 0X2FFF | 0X9000 - 0X9FFF | SOUTH CHIP B PTP F | 503 |

HIERARCHICAL TO PHYSICAL MEMORY MAPPED INPUT/OUTPUT TRANSLATION

FIELD

An embodiment of the invention generally relates to computer systems and more particularly to hierarchical to physical MMIO (Memory Mapped Input/Output) range translation for computer system buses.

BACKGROUND

Computer systems typically comprise a combination of computer programs and hardware, such as semiconductors, transistors, chips, and circuit boards. The hardware within a computer system is typically organized into components, such as processors, storage devices, and I/O (Input/Output) devices. These components typically communicate with each other via another component called a bus.

Buses can be parallel buses, which carry data words or multiple bits in parallel on multiple wires, or serial buses, which carry data in bit-serial form. A bus can be point-to-point, meaning that the bus connects only two components, or multi-drop, meaning that more than two components are connected to the bus. In a multi-drop bus, typically the bus has both data and address wires, and components connected to the bus listen for their unique destination address on the address wires, in order to discern whether data on the data wires is intended for them.

One example of a computer bus is called PCI EXPRESS (PERIPHERAL COMPONENT INTERCONNECT EXPRESS), which uses a network of point-to-point serial links. A pair of point-to-point PCI serial links makes up a lane. A hub routes the lanes and acts as a crossbar switch. This dynamic point-to-point behavior allows more than one pair of devices to communicate with each other at the same time. This format also allows channel grouping, where multiple lanes are bonded to a single device pair in order to provide higher bandwidth.

PCI EXPRESS devices communicate via a logical connection called an interconnect or link. A link is a point-to-point communication channel between two PCI EXPRESS ports, allowing both to send/receive ordinary PCI-requests (e.g., configuration read/writes, I/O read/writes, and memory read/writes) and interrupts. At the physical level, a link comprises one or more lanes.

A lane comprises a transmit and a receive pair of differential lines. Each lane comprises four wires, meaning that, conceptually, each lane is a full-duplex byte stream, transporting packets containing the data in eight-bit byte format, between the two endpoints of a link, in both directions simultaneously. PCI EXPRESS transmissions send control messages, including interrupts, over the same links used for data.

One way of accessing memory via an I/O bus is via a technique called memory-mapped I/O (MMIO), in which a processor maps addresses in an I/O device into the processor's address space in memory. Areas of the processor's addressable space in memory are reserved for I/O to/from I/O devices. This reservation may be either temporary or permanent. Each I/O device monitors the bus and responds to any processor's read/write from/to the device-assigned address space in memory. Thus, if the processor issues a read instruction to the device-assigned address space in memory, the I/O device receives the instruction from the bus and transmits the data (onto the bus) that is located at the corresponding address within the I/O device. Similarly, if the processor issues a write instruction to the device-assigned address space in memory, the I/O device receives the data from the bus and writes it to the corresponding address within the I/O device. In some MMIO schemes, the processor instructions that read/write from/to the device-assigned address space in memory are the same instructions that read/write from/to memory in address spaces that are not reserved for I/O devices. In other MMIO schemes, the processor instructions that read/write from/to the device-assigned address space in memory are different instructions from those that read/write from/to memory in address spaces that are not reserved for I/O devices.

SUMMARY

A method, computer-readable storage medium, and computer system are provided. In an embodiment, a translation of a hierarchical MMIO address range to a physical MMIO address range and an identifier of a bridge in a south chip are written to a north chip. A transaction is received that comprises a hierarchical MMIO address. The hierarchical MMIO address that is within the hierarchical MMIO address range is replaced in the transaction with the identifier of the bridge and with a physical MMIO address that is within the physical MMIO address range in the south chip. The transaction is sent to the device that is connected to the bridge in the south chip. The physical MMIO address range specifies a range of physical MMIO addresses in memory in the device.

It is to be noted, however, that the appended drawings illustrate only example embodiments of the invention, and are therefore not considered a limitation of its scope, for the invention may admit to other equally effective embodiments.

DETAILED DESCRIPTION

Figure 1:
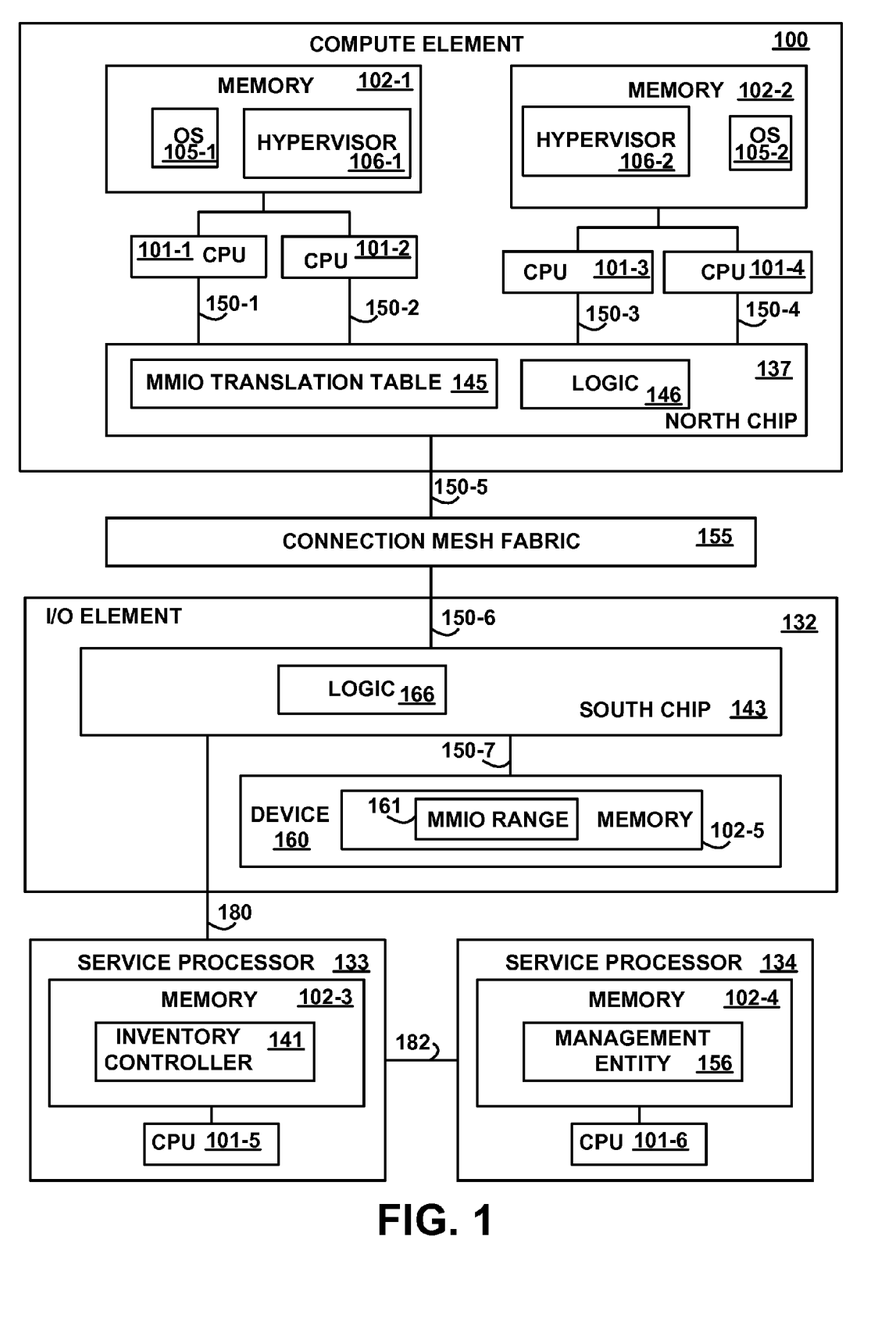
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system comprising the major components of a compute element 100 connected to an I/O (Input/Output) element 132 via a connection mesh fabric 155. The I/O element 132 is also connected to a service processor 133 via a bus, network, or communications link 180, and the service processor 133 is connected to another service processor 134 via a bus, network, or communications link 182.

The major components of the compute element 100 comprise memory 102-1, memory 102-2, central processing units (CPUs) 101-1, 101-2, 101-3, and 101-4, and a north chip 137. The CPUs 101-1 and 101-2 are connected to and share the memory 102-1, and the CPUs 101-3 and 101-4 are connected to and share the memory 102-2 via respective memory buses. The CPUs 101-1, 101-2, 101-3, and 101-4 are connected to the north chip 137 via respective buses 150-1, 150-2, 150-3, and 150-4. The CPUs 101-1, 101-2, 101-3, and 101-4 are also referred to herein as processors. The north chip 137 is connected to the connection mesh fabric 155 via a bus 150-5.

In various embodiments, the compute element 100 is a multi-user mainframe computer system, single-user computer system, or a server computer or similar electronic device that has little or no direct user interface, but receives requests from other computer systems (clients). In other embodiments, the compute element 100 is implemented as a desktop computer, a portable computer, a laptop or notebook computer, a tablet computer, a pocket computer, a telephone, a smart phone, a pager, an automobile, a teleconferencing system, an appliance, or any other appropriate type of electronic device.

Each processor executes instructions stored in the memory 102-1 and 102-2, and each processor may also include cache memory. The memories 102-1 and 102-2 store or encode respective operating systems 105-1 and 105-2, which, when executed on the processors, control the operations of the compute element 100. The memories 102-1 and 102-2 further store or encode respective hypervisors 106-1 and 106-2, which allocate resources to their respective operating systems 105-1 and 105-2, including allocating MMIO address ranges. In another embodiment, the operating systems 105-1 and 105-2 allocate their own MMIO address ranges.

The compute element 100 may use virtual addressing mechanisms that allow the programs of the compute element 100 to behave as if they only have access to a large, single storage entity instead of access to multiple, smaller storage entities. Thus, all portions of an operating systems 105-1 and 105-2 and the hypervisors 106-1 and 106-2 are not necessarily completely contained in the same storage device at the same time.

In various embodiments, the north chip 137 is implemented as a chip, integrated circuit, circuit board, logic devices, memory, and/or a processor. The north chip 137 comprises an MMIO translation table 145 and logic 146. The MMIO translation table 145 is stored in memory and comprises a translation or mapping of hierarchical MMIO address ranges to physical MMIO address ranges, as further described below with reference to FIGS. 4 and 5.

In an embodiment, the logic 146 is implemented as a chip, circuits, or logic devices. In another embodiment, the logic 146 comprises memory encoded with instructions or statements and a processor on which the instructions or statements execute or are interpreted. The logic 146 performs processing, operations, or functions, as further described below with reference to FIGS. 6 and 7.

In an embodiment, the connection mesh fabric 155 comprises a point-to-point serial connection between the compute element 100 and the I/O element 132. In other embodiments, the connection mesh fabric 155 may be any suitable network or combination of networks and may support any appropriate protocol suitable for communication of data and/or code to/from the compute element 100 and the I/O element 132. In an embodiment, the connection mesh fabric 155 may be implemented via an Ethernet network, but in other embodiments any appropriate network or combination of networks implementing any appropriate protocol may be used.

In various embodiments, the I/O element 132 is implemented as a system element, an electronic device, an endpoint, a computer, or a circuit board. The I/O element 132 comprises a south chip 143 connected to the connection mesh fabric 155 via a bus 150-6. The south chip 143 is further connected to a device 160 via a bus 150-7. The south chip 143 is implemented as a chip, integrated circuit, circuit board, logic devices, memory, and/or a processor. In an embodiment, the south chip 143 is identical to the north chip 137, but the chips 137 and 143 perform different functions depending on whether they are located on the compute element I/O 100 or the I/O element 132. In another embodiment, the chips 137 and 143 are different, and each is customized for its respective element.

The south chip 143 comprises logic 166. In an embodiment, the logic 166 is implemented as a chip, circuits, or logic devices. In another embodiment, the logic 166 comprises memory encoded with instructions or statements and a processor on which the instructions or statements execute or are interpreted. The logic 166 performs processing, operations, or functions, as further described below with reference to FIGS. 6 and 7.

In an embodiment, the device 160 comprises a storage device or a combination of storage devices, either connected within the I/O element 132 or connected directly or indirectly to the I/O element 132. In another embodiment, the device 160 comprises a network adapter, I/O adapter, or I/O processor that connects to a communications network. Although the device 160 is illustrated as being contained within the I/O element 132, in another embodiment, the device 160 is separate from and connected to the I/O element 132. The device 160 stores or encodes a physical MMIO address range 161 within the memory 102-5, which identifies the range of addresses which may be used to access (read/write from/to) the memory 102-5 in the device 160.

Although the buses 150-1, 150-2, 150-3, 150-4, 150-5, 150-6, and 150-7 are shown in FIG. 1 as relatively simple, single bus structures providing direct communication paths, in fact the buses 150-1, 150-2, 150-3, 150-4, 150-5, 150-6, and 150-7 may comprise multiple different buses or communication paths, which may be arranged in any of various forms, such as point-to-point links in hierarchical, star or web configurations, multiple hierarchical buses, parallel and redundant paths, or any other appropriate type of configuration. In an embodiment, the buses 150-1, 150-2, 150-3, and 150-4, 150-5, 150-6, and 150-7 are point-to-point serial buses, such as the PCI EXPRESS bus, but in other embodiments, any appropriate bus may be used. Furthermore, buses 150-1, 150-2, 150-3, 150-4, 150-5, 150-6, and 150-7 may comprise memory buses, I/O buses, I/O bus interface units, I/O processors, or any multiple and/or combination thereof.

The service processor 133 comprises memory 102-3 connected via a bus to a CPU 101-5. The memory 102-3 stores or encodes an inventory controller 141. The service processor 134 comprises memory 102-4 connected via a bus to a CPU 101-6. The memory 102-4 stores or encodes a management entity 156. In an embodiment, the inventory controller 141 and/or the management entity 156 comprise instructions or statements that execute on or are interpreted by instructions that execute on the respective CPUs 101-5 and 101-6. In another embodiment, the inventory controller 141 and/or the management entity 156 comprise circuits or logic devices in lieu of or in addition to a processor based system. The inventory controller 141 and the management entity 156 perform processing, operations, or functions, as further described below with reference to FIG. 6.

In various embodiments, the memory 102-1, 102-2, 102-3, 102-4, and 102-5 are random-access semiconductor memory, storage devices, non-volatile memory, volatile memory, disk drives, or storage mediums for storing or encoding data and programs. The memory 102-1, 102-2, 102-3, 102-4, and 102-5 are conceptually single monolithic entities, but in other embodiments the memory 102-1, 102-2, 102-3, 102-4, and 102-5 are more complex arrangements, such as hierarchies of caches and/or other memory devices. For example, the memory 102-1, 102-2, 102-3, 102-4, and 102-5 may exist in multiple levels of memory devices of varying sizes and speeds.

It should be understood that FIG. 1 is intended to depict the representative major components of the compute elements 100, the connection mesh fabric 155, the I/O elements 132, the service processor 133, and the service processor 134 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the compute element 100, the I/O element 132, the service processor 133, and/or the service processor 134 and that, when read and executed by one or more processors in the compute element 100, the I/O element 132, the service processor 133, and/or the service processor 134 or when interpreted by instructions that are executed by one or more processors, cause the compute element 100, the I/O element 132, the service processor 133, and/or the service processor 134 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device. Examples of computer-readable storage media include the memory 102-1, 102-2, 102-3, 102-4, and 102-5.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a compute element 100, I/O element 132, service processor 133, and/or service processor 134 via a variety of tangible computer-readable storage media that may be operatively or communicatively connected (directly or indirectly) to the processor or processors.

The computer program instructions may also be loaded onto a computer, compute element 100, I/O element 132, service processor 133, and/or service processor 134, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one ore more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a compute element 100, I/O element 132, service processor 133, and/or service processor 134 to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, compute elements, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
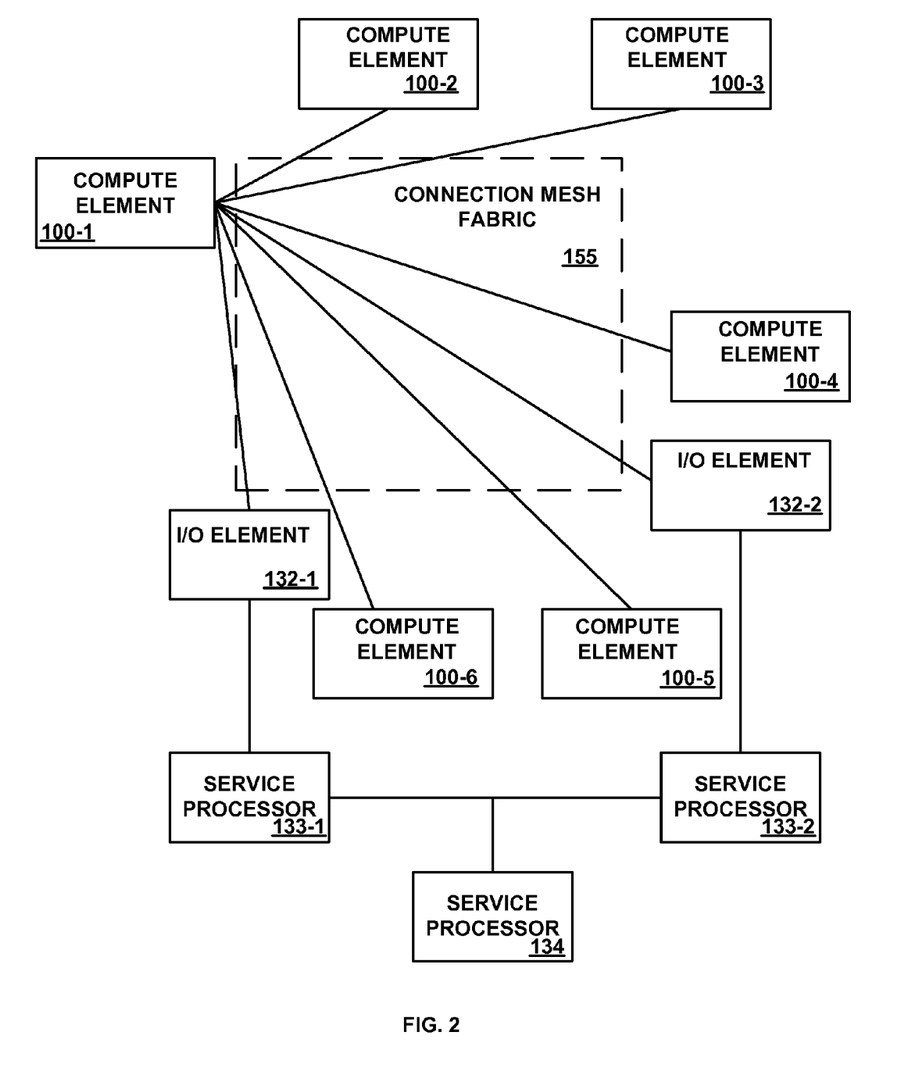
FIG. 2 depicts a block diagram illustrating selected components of an embodiment of the invention.

FIG. 2 depicts a block diagram illustrating the interaction of selected components of an embodiment of the invention. The compute elements 100-1, 100-2, 100-3, 100-4, 100-5, 100-6, and I/O elements 132-1 and 132-2 are connected via the connection mesh fabric 155. The compute elements 100-1, 100-2, 100-3, 100-4, 100-5, and 100-6 are examples of, and are generically referred to by, the compute element 100 (FIG. 1). The I/O elements 132-1 and 132-2 are examples of, and are generically referred to by, the I/O element 132 (FIG. 1).

The connection mesh fabric 155 comprises serial point-to-point links. For convenience of illustration, FIG. 2 depicts compute element 100-1 as connected to every other compute and I/O element 100-2, 100-3, 100-4, 100-5, 100-6, 132-1, and 132-2. But, each compute element 100 and I/O element 132 is connected to each and every other compute element 100 and I/O element 132 via high speed point-to-point links in an interconnection of everything-to-everything, which is referred to as the connection mesh fabric 155. Thus, if one point-to-point link fails, elements may still communicate to each other by hopping though another element. In an embodiment, the connection mesh fabric 155 is not necessarily confined to a single chassis or rack, but may span multiple chassis or racks.

In a serial communication link, data is sent one bit at a time, sequentially over a single channel, wire, or bus. Serial communication is in contrast to parallel communication, where several bits are sent together, on a link with several parallel channels or wires.

FIG. 2 also illustrates the service processes 133-1 and 133-2 connected to respective I/O elements 132-1 and 132-2. The I/O elements 132-1 and 132-2 are examples of, and are generically referred to by, the I/O element 132 (FIG. 1). The service processes 133-1 and 133-2 are examples of, and are generically referred to by, the service processor 133 (FIG. 1). Thus, referring again to FIG. 2, each I/O element 132-1 and 132-2 is connected to a respective different service processor 133-1 and 133-2, which is local to its I/O element 132. The service processors 132-1 and 132-2 are further connected to the service processor 134 via a bus, network, or communications link.

Figure 3:
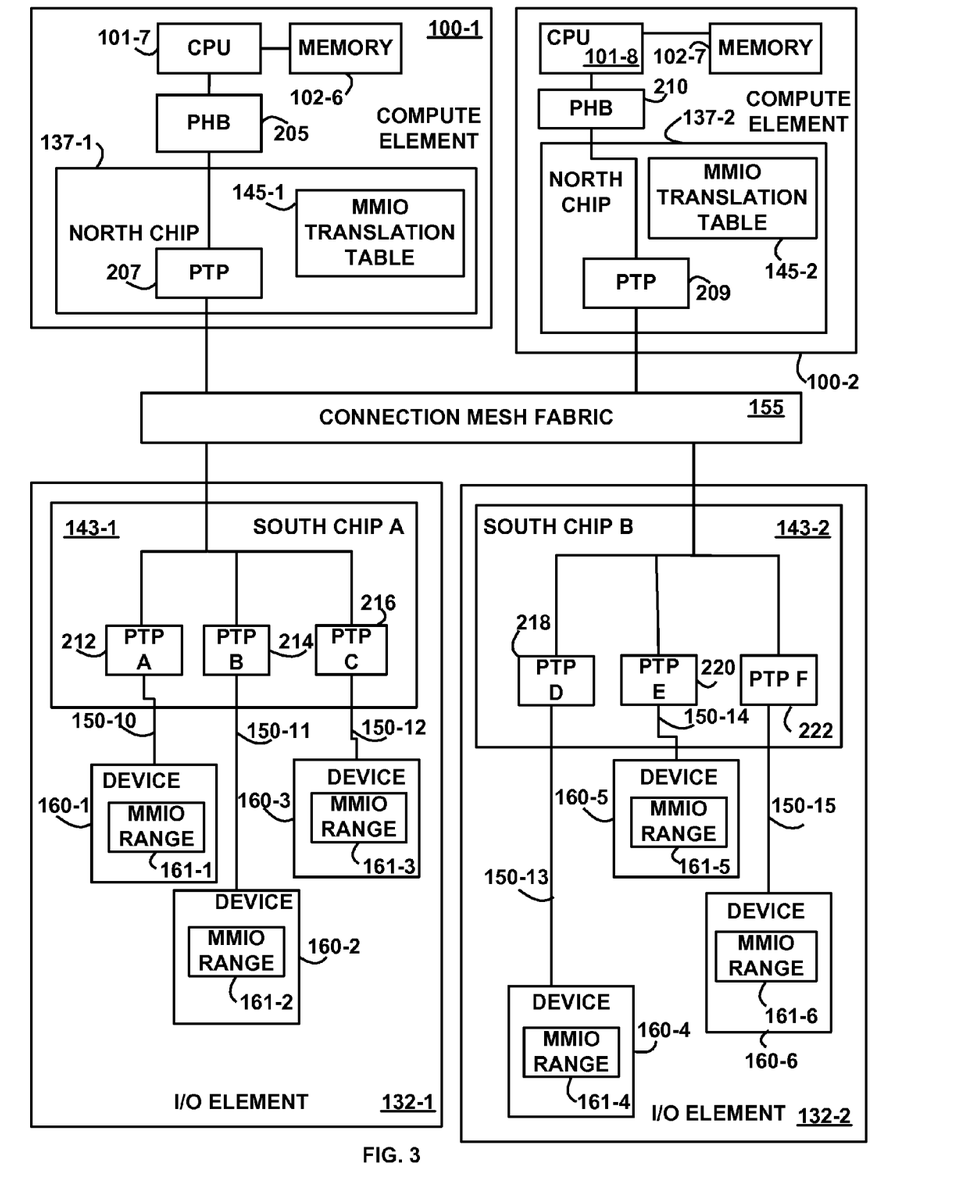
FIG. 3 depicts a block diagram illustrating more detail of selected components of an embodiment of the invention.

FIG. 3 depicts a block diagram illustrating more detail of selected components of an embodiment of the invention. As illustrated in FIG. 3, the compute elements 100-1 and 100-2 are connected via the connection mesh fabric 155 to the I/O elements 132-1 and 132-2.

The compute element 100-1 comprises a CPU 101-7 connected via a bus to a PHB (PERIPHERAL COMPONENT INTERCONNECT Host Bridge) 205, which is connected via a different bus to a PTP (PCI to PCI) 207 in a north chip 137-1. The CPU 101-7 is further connected via a bus to memory 102-6. The CPU 101-7 is an example of the CPUs 101-1, 101-2, 101-3, or 101-4 (FIG. 1). A bridge is an electronic component that forwards packets of data between two different networks, different segments of networks, or different buses that use the same communications protocol, based on a destination address in the packet. Although an embodiment of the invention is described in the context of the PCI EXPRESS bus protocol, in other embodiments any appropriate bus protocol may be used. The memory 102-6 is an example of the memory 102-1 and 102-2.

The north chip 137-1 comprises a PTP bridge 207, meaning that both the ingress and egress buses that are connected to respective ingress and egress ports of the PTP 207 are PCI buses. The north chip 137-1 further comprises an MMIO translation table 145-1, which is an example of, and is generically referred to by, the MMIO translation table 145 (FIG. 1). The north chip 137-1 is an example of, and is generically referred to by, the north chip 137 (FIG. 1).

The compute element 100-2 comprises a CPU 101-8 connected via a bus to a PHB 210, which is connected via a different bus to a PTP 209 in a north chip 137-2. The CPU 101-8 is further connected via a bus to memory 102-7. The CPU 101-8 is an example of the CPUs 101-1, 101-2, 101-3, or 101-4 (FIG. 1). The north chip 137-2 comprises a PTP (PCI to PCI) bridge 209, meaning that both the ingress and the egress bus that are connected to respective ingress and egress ports of the PTP 209 are PCI buses. The north chip 137-2 further comprises an MMIO translation table 145-2, which is an example of, and is generically referred to by, the MMIO translation table 145 (FIG. 1). The north chip 137-2 is an example of, and is generically referred to by, the north chip 137 (FIG. 1). The memory 102-7 is an example of the memory 102-1 and 102-2.

The I/O element 132-1 comprises a south chip 143-1 connected to devices 160-1, 160-2, and 160-3 via respective buses 150-10, 150-11, and 150-12. The south chip 143-1 comprises a PTP A 212, a PTP B 214, and a PTP C 216. Each of the PTP A 212, the PTP B 214, and the PTP C 216 comprises a respective ingress port, which is connected to the connection mesh fabric 155 via an ingress bus. The ingress port is a receiving port, meaning that the PTP receives signals from the connection mesh fabric 155 via the ingress port and ingress bus. Each of the PTP A 212, the PTP B 214, and the PTP C 216 further comprises a respective egress port, which is connected to respective devices 160-1, 160-2, and 160-3 via respective egress buses 150-10, 150-11, and 150-12.

An egress port is a transmitting port, meaning that the PTP transmits signals on a bus to a device via an egress port. In an embodiment, the buses 150-10, 150-11, and 150-12, are point-to-point serial buses, such as the PCI EXPRESS bus, but in other embodiments, any appropriate bus may be used. In an embodiment, a single port may act as an ingress port at one time while data is being transmitted in one direction and an egress port at other time at another time while data is being transmitted in the other direction. In another embodiment, a single port only acts as an ingress or an egress port, and multiple ports are present, in order to provide bi-directional data transfer (both from a compute element 100 to a device 160 and from a device 160 to a compute element 100).

The I/O element 132-2 comprises a south chip 143-2 connected to devices 160-4, 160-5, and 160-6 via respective buses 150-13, 150-14, and 150-15. The south chip 143-2 comprises a PTP D 218, a PTP E 220, and a PTP F 222. Each of the PTP D 218, the PTP E 220, and the PTP F 222 comprises an ingress port, which is connected to the connection mesh fabric 155 via an ingress bus. Each of the PTP D 218, the PTP E 220, and the PTP F 222 further comprises an egress port, which is connected to respective devices 160-4, 160-5, and 160-6 via respective egress buses 150-13, 150-14, and 150-15. In an embodiment, the egress buses 150-13, 150-14, and 150-15, are point-to-point serial buses, such as the PCI EXPRESS bus, but in other embodiments, any appropriate bus may be used.

The devices 160-1, 160-2, 160-3, 160-4, 160-5, and 160-6 are examples of the device 160 (FIG. 1). Each of the devices 160-1, 160-2, 160-3, 160-4, 160-5, and 160-6 stores or encodes in its memory a respective physical MMIO address range 161-1, 161-2, 161-3, 161-4, 161-5, and 161-6. The physical MMIO address range 161 (FIG. 1) generically refers to the physical MMIO address ranges 161-1, 161-2, 161-3, 161-4, 161-5, and 161-6.

Figure 4:
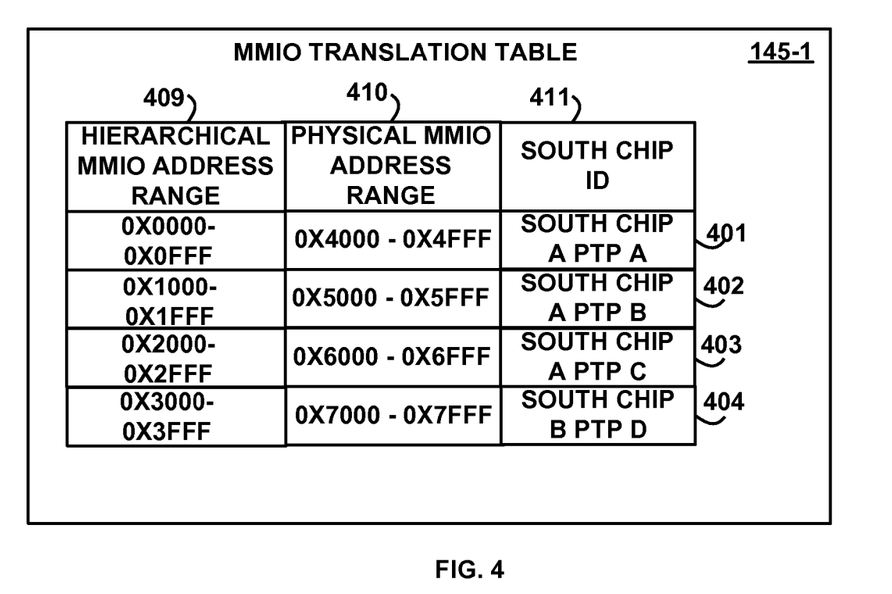
FIG. 4 depicts a block diagram of an example data structure for an MMIO translation table, according to an embodiment of the invention.

FIG. 4 depicts a block diagram of an example data structure for an MMIO translation table 145-1, according to an embodiment of the invention. The MMIO translation table 145-1 comprises example rows 401, 402, 403, and 404, each of which includes a hierarchical MMIO address range field 409, a physical MMIO address range field 410, and a south chip bridge identifier field 411.

The hierarchical MMIO address range field 409 specifies a range or extent of hierarchical MMIO addresses that the compute element 100-1 may use to address the memory of a device 160 that is connected to a PTP bridge in a south chip 143 that is identified by the corresponding south chip identifier 411 in the same row. The hierarchical MMIO address range field 409 specifies a beginning (lower bound) of the range and an end (upper bound) of the range. The lower bound is less than the upper bound. The values in the hierarchical MMIO address range field 409 are unique within the compute element 100-1 that assigns them, but are not necessarily unique within a south chip 143 or across all south chips 143.

The physical MMIO address range field 410 specifies a range of MMIO addresses 161 within the memory 102-5 of the device 160 that is connected to a PTP bridge in a south chip 143 that is identified by the corresponding south chip identifier 411 in the same row. The physical MMIO address range field 410 specifies a lower bound of the range and an upper bound of the range. Thus, the MMIO translation table 145-1 represents a mapping or translation of hierarchal MMIO address ranges 409 used by the compute element 100-1 to physical MMIO address ranges 410 used to access the memory 102-5 in the device 160 that is connected to a PTP bridge identified by the south chip bridge identifier 411. In an embodiment, the physical MMIO address ranges 410 are unique across all I/O elements 132 and devices 160 because a single selected inventory controller 141 sets the physical MMIO address ranges 410 for all devices 160.

The row 401 in the MMIO translation table 145-1 comprises example data that indicates that the PTP bridge A 212 is connected to a device 160-1 that has a physical MMIO address range of 0x4000 through 0x4FFF in the memory 102-5 in the device 160 that maps to a corresponding hierarchical MMIO address range of 0x0000 through 0x0FFF in the memory 102-6 in the compute element 100-1. The lower bound of the physical MMIO address range is 0x4000 and the upper bound of the physical MMIO address range is 0x4FFF. The lower bound of the hierarchical MMIO address range is 0x0000 and the upper bound of the hierarchical MMIO address range is 0xFFFF. Thus, in response to the CPU 101-7 issuing a read/write command from/to a hierarchical MMIO address within the range of 0x0000 through 0x0FFF, the north chip 137-1 finds the hierarchical MMIO address range 409 in the row 401 that encompasses the hierarchical MMIO address specified by the read/write command, replaces the hierarchical MMIO address in the read/write command with the corresponding physical MMIO address within the range 0x4000 through 0x4FFF and sends the read/write command to the device 160 connected to the PTP A 212 within the south chip A 143-1.

In an embodiment, the north chip 137-1 determines the corresponding physical MMIO address by calculating the difference between the hierarchical MMIO address in the write command and the beginning (lower bound) of the hierarchical MMIO address range and adding that difference to the beginning (lower bound) of the physical MMIO address range. For example, if the hierarchical MMIO address in the read/write command is 0x0002, then the difference is: 0x0002−0x0000=0x0002. Adding that difference to the beginning (lower bound) of the physical MMIO address range yields a corresponding physical MMIO address of: 0x4000+0x0002=0x4002.

The row 402 in the MMIO translation table 145-1 comprises example data that indicates that the PTP bridge B 214 is connected to the device 160-2 that has a physical MMIO address range of 0x5000 through 0x5FFF in the memory 102-5 that maps to a corresponding hierarchical MMIO address range of 0x1000 through 0x1FFF in the memory 102-6. Thus, in response to the CPU 101-7 issuing a read/write command from/to a hierarchical MMIO address within the range of 0x1000 through 0x1FFF, the north chip 137-1 finds the hierarchical MMIO address range 409 in the row 402 that encompasses the hierarchical MMIO address specified by the read/write command, replaces the hierarchical MMIO address in the read/write command with the corresponding physical MMIO address within the range 0x5000 through 0x5FFF and sends the read/write command to the device 160-2 connected to the PTP B 214 within the south chip A 143-1.

In an embodiment, the north chip 137-1 determines the corresponding physical MMIO address by calculating the difference between the hierarchical MMIO address in the write command and the beginning (lower bound) of the hierarchical MMIO address range and adding that difference to the beginning (lower bound) of the physical MMIO address range. For example, if the hierarchical MMIO address in the read/write command is 0x1002, then the difference is: 0x1002−0x1000=0x0002. Adding that difference to the beginning (lower bound) of the physical MMIO address range yields a corresponding physical MMIO address of: 0x5000+0x0002=0x5002.

The row 403 in the MMIO translation table 145-1 comprises example data that indicates that the PTP bridge C 216 is connected to the device 160-3 that has a physical MMIO address range of 0x6000 through 0x6FFF in the memory 102-5 that maps to a corresponding hierarchical MMIO address range of 0x2000 through 0x2FFF in the memory 102-6. Thus, in response to the CPU 101-7 issuing a read/write command from/to a hierarchical MMIO address within the range of 0x2000 through 0x2FFF, the north chip 137-1 finds the hierarchical MMIO address range 409 in the row 403 that encompasses the hierarchical MMIO address specified by the read/write command, replaces the hierarchical MMIO address in the read/write command with the corresponding physical MMIO address within the range 0x6000 through 0x6FFF and sends the read/write command to the device 160-3 connected to the PTP C 216 within the south chip A 143-1.

In an embodiment, the north chip 137-1 determines the corresponding physical MMIO address by calculating the difference between the hierarchical MMIO address in the write command and the beginning (lower bound) of the hierarchical MMIO address range and adding that difference to the beginning (lower bound) of the physical MMIO address range. For example, if the hierarchical MMIO address in the read/write command is 0x2002, then the difference is: 0x2002−0x2000=0x0002. Adding that difference to the beginning (lower bound) of the physical MMIO address range yields a corresponding physical MMIO address of: 0x6000+0x0002=0x6002.

The row 404 in the MMIO translation table 145-1 comprises example data that indicates that the PTP bridge D 218 is connected to the device 160-4 that has a physical MMIO address range of 0x7000 through 0x7FFF in the memory 102-5 that maps to a corresponding hierarchical MMIO address range of 0x3000 through 0x3FFF in the memory 102-6. Thus, in response to the CPU 101-7 issuing a read/write command from/to a hierarchical MMIO address within the range of 0x3000 through 0x3FFF, the north chip 137-1 finds the hierarchical MMIO address range 409 in the row 404 that encompasses the hierarchical MMIO address specified by the read/write command, replaces the hierarchical MMIO address in the read/write command with the corresponding physical MMIO address within the range 0x7000 through 0x7FFF and sends the read/write command to the device 160-4 connected to the PTP D 218 within the south chip B 143-2.

In an embodiment, the north chip 137-1 determines the corresponding physical MMIO address by calculating the difference between the hierarchical MMIO address in the write command and the beginning (lower bound) of the hierarchical MMIO address range and adding that difference to the beginning (lower bound) of the physical MMIO address range. For example, if the hierarchical MMIO address in the read/write command is 0x3002, then the difference is: 0x3002−0x3000=0x0002. Adding that difference to the beginning (lower bound) of the physical MMIO address range yields a corresponding physical MMIO address of: 0x7000+0x0002=0x7002.

Figure 5:
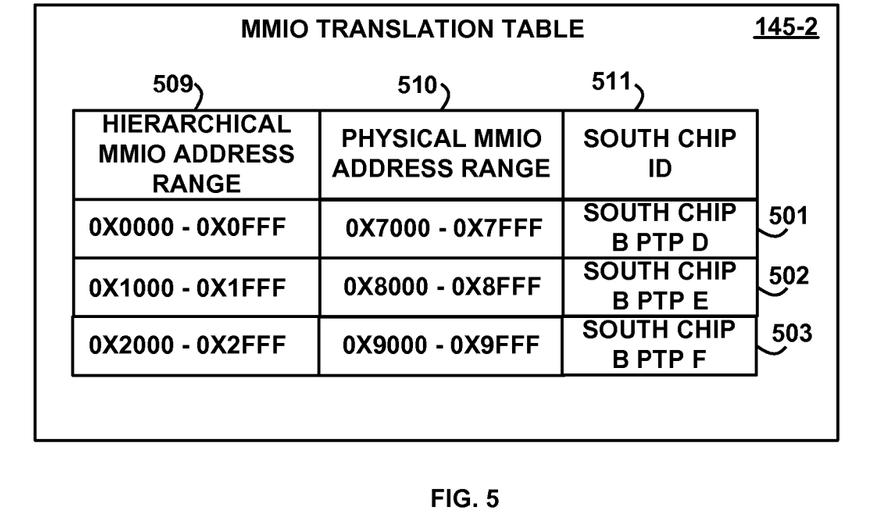
FIG. 5 depicts a block diagram of another example data structure for an MMIO translation table, according to an embodiment of the invention.

FIG. 5 depicts a block diagram of an example data structure for an MMIO translation table 145-2, according to an embodiment of the invention. The MMIO translation table 145-2 comprises example rows 501, 502, and 503, each which includes a hierarchical MMIO address range field 509, a physical MMIO address range field 510, and a south chip bridge identifier field 511.

The hierarchical MMIO address range field 509 specifies a range or extent of hierarchical MMIO addresses that the compute element 100-2 may use to address the memory of a device 160 that is connected to a PTP bridge in a south chip 143 that is identified by the corresponding south chip identifier 511 in the same row. The values in the hierarchical MMIO address range field 509 are unique within the compute element 100-2 that assigns them, but are not necessarily unique within a south chip 143 or across all south chips 143.

The physical MMIO address range field 510 specifies a range of physical MMIO addresses 161 within the memory 102-5 of the device 160 that is connected to a PTP bridge in a south chip 143 that is identified by the corresponding south chip identifier 511 in the same row. Thus, the MMIO translation table 145-2 represents a mapping or translation of hierarchal MMIO address ranges 509 used by the compute element 100-2 to physical MMIO address ranges 510 used to access the memory 102-5 in the device 160 that is connected to a PTP bridge identified by the south chip bridge identifier 511. In an embodiment, the physical MMIO address ranges 510 are unique across all I/O elements 132 and devices 160 because a single selected inventory controller 141 sets the physical MMIO address ranges 510 for all devices 160.

The row 501 in the MMIO translation table 145-2 comprises example data that indicates that the PTP bridge D 218 is connected to a device 160-4 that has a physical MMIO address range of 0x7000 through 0x7FFF in the memory 102-5 that maps to a corresponding hierarchical MMIO address range of 0x0000 through 0x0FFF in the memory 102-7. Thus, in response to the CPU 101-8 issuing a read/write command from/to a hierarchical MMIO address within the range of 0x0000 through 0x0FFF, the north chip 137-2 finds the hierarchical MMIO address range 509 in the row 501 that encompasses the hierarchical MMIO address specified by the read/write command, replaces the hierarchical MMIO address in the read/write command with the corresponding physical MMIO address within the range 0x7000 through 0x7FFF and sends the read/write command to the device 160-4 connected to the PTP D 218 within the south chip A 143-2.

In an embodiment, the north chip 137-2 determines the corresponding physical MMIO address by calculating the difference between the hierarchical MMIO address in the write command and the beginning (lower bound) of the hierarchical MMIO address range and adding that difference to the beginning (lower bound) of the physical MMIO address range. For example, if the hierarchical MMIO address in the read/write command is 0x0002, then the difference is:

0x0002−0x0000=0x0002. Adding that difference to the beginning (lower bound) of the physical MMIO address range yields a corresponding physical MMIO address of: 0x7000+0x0002=0x7002.

The row 502 in the MMIO translation table 145-2 comprises example data that indicates that the PTP bridge E 220 is connected to the device 160-5 that has a physical MMIO address range of 0x8000 through 0x8FFF in the memory 102-5 that maps to a corresponding hierarchical MMIO address range of 0x1000 through 0x1FFF in the memory 102-7. Thus, in response to the CPU 101-8 issuing a read/write command from/to a hierarchical MMIO address within the range of 0x1000 through 0x1FFF, the north chip 137 finds the hierarchical MMIO address range 509 in the row 502 that encompasses the hierarchical MMIO address specified by the read/write command, replaces the hierarchical MMIO address in the read/write command with the corresponding physical MMIO address within the range 0x8000 through 0x8FFF and sends the read/write command to the device 160-5 connected to the PTP E 220 within the south chip B 143-2.

In an embodiment, the north chip 137-2 determines the corresponding physical MMIO address by calculating the difference between the hierarchical MMIO address in the write command and the beginning (lower bound) of the hierarchical MMIO address range and adding that difference to the beginning (lower bound) of the physical MMIO address range. For example, if the hierarchical MMIO address in the read/write command is 0x1002, then the difference is: 0x1002−0x1000=0x0002. Adding that difference to the beginning (lower bound) of the physical MMIO address range yields a corresponding physical MMIO address of: 0x8000+0x0002=0x8002.

The row 503 in the MMIO translation table 145-2 comprises example data that indicates that the PTP bridge F 222 is connected to the device 160-6 that has a physical MMIO address range of 0x9000 through 0x9FFF in the memory 102-5 that maps to a corresponding hierarchical MMIO address range of 0x2000 through 0x2FFF in the memory 102-7. Thus, in response to the CPU 101-8 issuing a read/write command from/to a hierarchical MMIO address within the range of 0x2000 through 0x2FFF, the north chip 137 finds the hierarchical MMIO address range 509 in the row 503 that encompasses the hierarchical MMIO address specified by the read/write command, replaces the hierarchical MMIO address in the read/write command with the corresponding physical MMIO address within the range 0x9000 through 0x9FFF and sends the read/write command to the device 160-6 connected to the PTP F 222 within the south chip B 143-2.

In an embodiment, the north chip 137-2 determines the corresponding physical MMIO address by calculating the difference between the hierarchical MMIO address in the write command and the beginning (lower bound) of the hierarchical MMIO address range and adding that difference to the beginning (lower bound) of the physical MMIO address range. For example, if the hierarchical MMIO address in the read/write command is 0x2002, then the difference is: 0x2002−0x2000=0x0002. Adding that difference to the beginning (lower bound) of the physical MMIO address range yields a corresponding physical MMIO address of: 0x9000+0x0002=0x9002.

Thus, as illustrated by the row 501 in FIG. 5 and the row 404 in FIG. 4, different hierarchical MMIO address ranges may map to the same physical MMIO address range in the same device connected to the same PTP bridge connected to the same south chip 143. Further, as illustrated by the row 401 in FIG. 4 and the row 505 in FIG. 5, the same hierarchical MMIO address range used by different compute elements 100-1 and 100-2 may map to different physical MMIO address ranges in different devices connected to different PTP bridges connected to different south chips 143.

Figure 6:
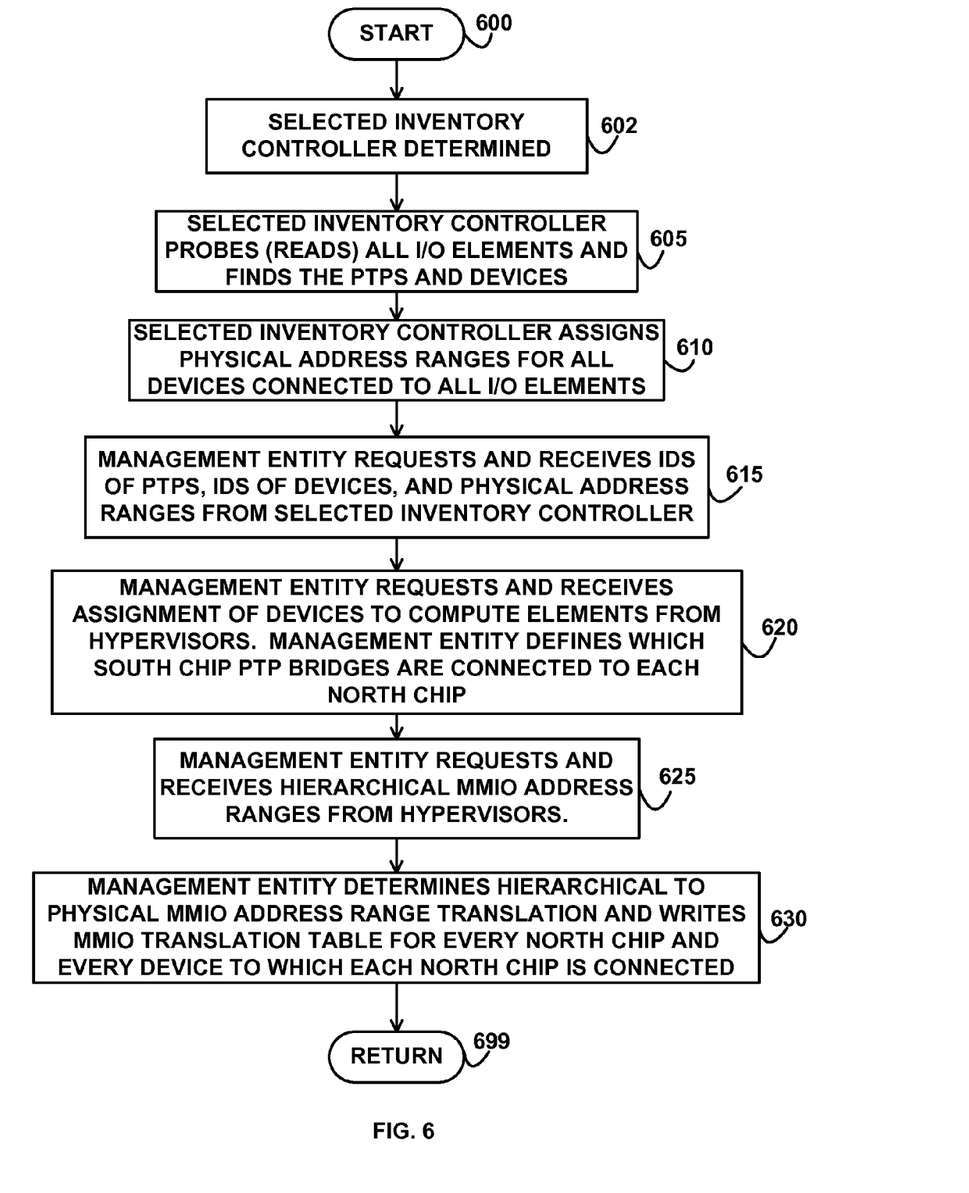
FIG. 6 depicts a flowchart of example processing for an inventory controller and an management entity, according to an embodiment of the invention.

FIG. 6 depicts a flowchart of example processing for an inventory controller and a management entity, according to an embodiment of the invention. Control begins at block 600.

Control then continues to block 602 where a selected inventory controller is determined from among all the inventory controllers 141. In an embodiment, the selected inventory controller is determined by a voting process, such as the inventory controllers 141 voting by sending their bus address to every other inventory controller 141, and the inventory controller whose bus address is the highest (or the lowest), as compared to the bus addresses it receives, selects itself as the selected inventory controller. In another embodiment, the management entity 156 selects the selected inventory controller randomly or arbitrarily from among all the inventory controllers 141.

Control then continues to block 605 where each inventory controller 141 in each I/O element 132 probes (reads) the south chip 143 in its locally connected I/O element 132 and finds the PTP bridges and the egress buses that connect devices 160 to the PTP bridges. The inventory controller 141 sends a request or command to its locally connected I/O element 132 that requests data that describes the PTP bridges, the buses of the south chip 143, and the devices 160 that connect to the buses. In response, the south chip 143 sends to the inventory controller 141 the south chip bridge identifiers of the PTP bridges in the south chip 143 and indications that the PTP bridges are connected via egress buses to devices 160, identifiers of the connected devices 160, and the amount or size of the memory in the connected devices 160. Each inventory controller 141 sends the data that describes the PTP bridges, the buses of the south chip 143, the devices 160 that connect to the buses, and the memory size in the devices to the selected inventory controller.

Control then continues to block 610 where the selected inventory controller determines the physical MMIO address ranges for all the devices 160, even for those devices that are connected to I/O elements that are not directly connected to the service processor that comprises the selected inventory controller. The physical MMIO address ranges are unique for all I/O elements 132 and for all devices 160. In various embodiments, the selected inventory controller determines the physical MMIO address ranges randomly or by incrementing a counter, with each successive device 160 having a physical MMIO address range that is more or a certain number more than the address range of the previous device 160. The selected inventory controller assigns to each device 160 a physical MMIO address range sufficient to access the memory in the device 160. In other embodiments, the inventory controller 141 uses any appropriate technique for assigning physical MMIO address ranges.

The selected inventory controller sends a configuration write command to each inventory controller 141, which forwards the configuration write command to its locally connected I/O element 132. The configuration write commands include the assigned physical MMIO address range for the devices 160.

Each of the devices 160 receives its respective configuration write command and its respective physical MMIO address range. Each of the devices 160 stores the physical MMIO address range 161 to its respective memory 102-5. Each of the devices 160 uses its physical MMIO address range to access its memory 102-5 in response to read and write commands and to find the address in its memory 102-5 that is specified by a read/write command. Thus, the physical addresses that the devices 160 use to find locations within their memory 102-5 may change over time, depending on the physical MMIO address ranges determined by the selected inventory controller.

Control then continues to block 615 where the management entity 156 requests and receives identifiers of PTP bridges, identifiers of devices 160, and physical MMIO address ranges for each device 160 from the selected inventory controller.

Control then continues to block 620 where the management entity 156 requests and receives from the hypervisors 106-1 and 106-2 or the operating systems 105-1 and 105-2 an assignment or mapping of the devices 160 to the compute elements 100. The management entity 156 further defines which south chip PTP bridges are connected to each north chip 137.

Using the example of FIG. 3, the hypervisor assigned the devices 160-1, 160-2, and 160-3 to the compute element 100-1, assigned the devices 160-5 and 160-6 to the compute element 100-2, and assigned the device 160-4 to both the compute elements 100-1 and 100-2. Assigning a device 160 to a compute element 100 means that the hypervisor sends identifiers of the assigned devices 160 to the operating system 105-1 or 105-2 or hypervisor 106-1 or 106-2 to which the device 160 is assigned and gives the operating system or hypervisor permission to read/write data from/to the device 160. The operating systems or hypervisors subsequently send read/write commands to their assigned devices 160 and do not send read/write commands to devices 160 to which they are not assigned.

In various embodiments, the operating systems 105-1 or 105-2 or hypervisors 106-1 or 106-2 may determine the assignment of devices 160 to compute elements 100 from requests or commands entered via a user interface or by matching the type of a compute element 100 to a type of the device 160. In various embodiments, the operating system 105-1 or 105-2 or hypervisor 106-1 or 106-2 assigns a device 160 with a type that indicates a network device to a compute element 100 with a type that indicates it contains an application server that responds to queries from a network and assigns another device with a type that indicates a storage device controller to a compute element 100 with a type that indicates it contains a database server that reads/writes from/to a database that is stored in a storage device.

Referring again to FIG. 6, control then continues to block 625 where the management entity 156 requests and receives hierarchical MMIO address ranges from the operating systems 105-1 or 105-2 or the hypervisors 106-1 and 106-2 for each device 160 and PTP bridge to which the device 160 connects. In various embodiments, the operating system 105-1 or 105-2 or the hypervisor 106-1 or 106-2 determines the hierarchical MMIO address ranges for each device 160 assigned or allocated to the operating system 105-1 or 105-2 or the compute elements 100. In an embodiment, the operating system 105-1 or 105-2 or the hypervisor 106-1 or 106-2 determines the hierarchical MMIO address ranges based on the amount of MMIO memory in the devices 160 that are assigned to the compute element 100, based on the amount of storage in the memory 102-1 or 102-2 in the compute element 100 that is available to be assigned to the devices 160, or based on any other appropriate criteria.

The hierarchical MMIO address ranges for the same device 160 used by different operating systems 105-1 or 105-2, different hypervisors 106-1 or 106-2, or different compute elements 100 may be different because the various operating systems 105-1 or 105-2, hypervisors 106-1 or 106-2, and compute elements 100 do not necessarily share or coordinate their MMIO address ranges with each other, do not necessarily have the same devices 160 assigned to them, and do not necessarily contain the same amount of memory 102-1 and 102-2.

Control then continues to block 630 where the management entity 156 determines the hierarchical to physical MMIO address range translation for every north chip 137 and every device 160 to which each north chip 137 is connected. That is, the management entity 156 maps the hierarchical MMIO address ranges to the physical MMIO address ranges and bridge identifiers. Thus, the management entity 156 determines the mapping or translation of the hierarchical MMIO address ranges that the compute elements 100 assign to the physical MMIO address ranges and the PTP bridge identifiers that the selected inventory controller assigns by matching the PTP bridge identifiers received from the compute element 100 (along with the hierarchical MMIO address ranges) to the PTP bridge identifiers received from the selected inventory controller (along with the physical MMIO address ranges). In response to finding those PTP bridge identifiers that match, the management entity 156 assigns a mapping or translation of the corresponding hierarchical MMIO address ranges to physical MMIO address ranges for the same matching PTP bridge identifier in the same row in the MMIO translation table 145-1 or 145-2.

The management entity 156 then writes the hierarchical MMIO address range 409 or 509, the physical MMIO address range 410 or 510, and the south chip bridge identifier 411 or 511 (identifying the PTP bridge in the south chip 143) to all the MMIO translation tables 145 for all the devices 160. Control then continues to block 699 where the logic of FIG. 6 returns.

Figure 7:
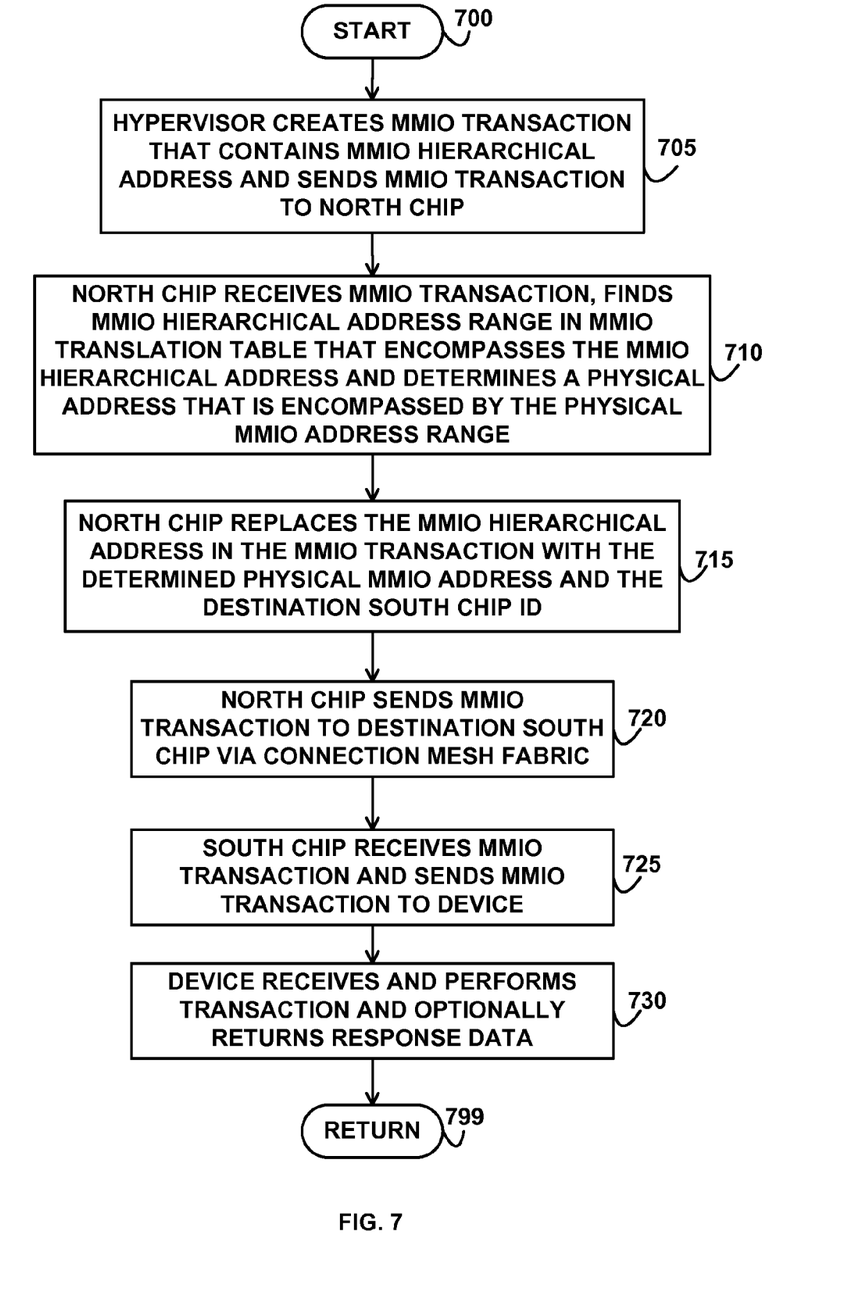
FIG. 7 depicts a flowchart of example processing for an MMIO transaction, according to an embodiment of the invention.

FIG. 7 depicts a flowchart of example processing for an MMIO transaction, according to an embodiment of the invention. Control begins at block 700.

Control then continues to block 705 where the hypervisor 106-1 or 106-2 or the operating system 105-1 or 105-2 creates an MMIO transaction that contains a hierarchical MMIO address and sends the MMIO transaction to the north chip 137. In various embodiments, the MMIO transaction requests the writing of data to or the reading of data from a hierarchical MMIO address in the device 160.

Control then continues to block 710 where the north chip 137 receives the MMIO transaction and finds a hierarchical MMIO address range 409 or 509 in the MMIO translation table 145-1 or 145-2 that contains or encompasses the hierarchical MMIO address of the MMIO transaction. The hierarchical MMIO address range 409 or 509 in a row of the MMIO translation table 145-1 or 145-2 contains or encompasses the hierarchical MMIO address if the hierarchical MMIO address in the MMIO transaction is greater than or equal to the lower bound of the hierarchical MMIO address range 409 or 509 and less than or equal to the upper bound of the hierarchical MMIO address range 409 or 509, i.e., if the hierarchical MMIO address is within the hierarchical MMIO address range 409 or 509. If the hierarchical MMIO address in the MMIO transaction is less than the lower bound of the hierarchical MMIO address range 409 or 509 or greater than the upper bound of the hierarchical MMIO address range 409 or 509, then the hierarchical MMIO address in the MMIO transaction is not encompassed by and is not within the hierarchical MMIO address range 409 or 509 of that row in the MMIO translation table 145-1 or 145-2.

The north chip 137 further determines a physical MMIO address that corresponds to the hierarchical MMIO address and is encompassed by the physical MMIO address range 410 or 510 in the same row in the MMIO translation table 145-1 or 145-2. In an embodiment, the north chip 137 performs the determination by calculating the difference between the hierarchical MMIO address in the MMIO transaction and the lower bound of the hierarchical MMIO address range 409 or 509 and adding that difference to the lower bound of the physical MMIO address range 410 or 510 in the same row, yielding the corresponding physical MMIO address. In another embodiment, the north chip 137 determines the corresponding physical MMIO address by calculating the difference between the hierarchical MMIO address in the write command and the end (upper bound) of the hierarchical MMIO address range 409 or 509 and subtracting that difference from the end (upper bound) of the physical MMIO address range 410 or 510 in the same row.

Control then continues to block 715 where the north chip 137 replaces the hierarchical MMIO address in the MMIO transaction with the determined corresponding physical MMIO address and the south chip identifier 411 or 511 from the same row in the MMIO translation table 145-1 or 145-2 as the hierarchical MMIO address range 409 or 509 that encompassed the hierarchical MMIO address of the MMIO transaction.

Control then continues to block 720 where the north chip 137 sends the MMIO transaction to the destination south chip identified by the south chip identifier 411 or 511 via the connection mesh fabric 155.

Control then continues to block 725 where the south chip receives the MMIO transaction and sends the MMIO transaction to the device 160 that is connected to the south chip 143 via a bus that connects to the PTP bridge that is identified in the south chip identifier in the transaction.

Control then continues to block 730 where the device 160 receives and performs the MMIO transaction, writes data from the MMIO transaction to the physical MMIO address specified in the transaction, reads data from the physical MMIO address specified in the MMIO transaction, and/or optionally returns response data to the hypervisor 106-1 or 106-2 or operating system 105-1 or 105-2 via the south chip 143, the connection mesh fabric 155, and the north chip 137.

Control then continues to block 799 where the logic of FIG. 7 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   writing, to a north chip, a translation of a hierarchical MMIO address range to a physical MMIO address range and an identifier of a bridge in a south chip;
   receiving a transaction comprising a hierarchical MMIO address;
   in response to the receiving, replacing the hierarchical MMIO address in the transaction that is within the hierarchical MMIO address range with a physical MMIO address that is within the physical MMIO address range and with the identifier of the bridge in the south chip, wherein the bridge in the south chip comprises an electronic component that forwards packets of data; and
   in response to the replacing, sending the transaction to the bridge in the south chip identified by the identifier in the transaction.

2. The method of claim 1, wherein the sending the transaction to the bridge further comprises:
   sending the transaction to a device that is connected to the bridge, wherein the physical MMIO address range specifies a range of physical MMIO addresses in memory in the device.

3. The method of claim 1, wherein the sending the transaction further comprises sending the transaction via a connection mesh fabric that comprises a point-to-point serial link.

4. The method of claim 2, further comprising:
   reading data that describes the device and the bridge from the south chip; and
   in response to the reading, determining the physical MMIO address range and sending the physical MMIO address range to the device, wherein the device stores the physical MMIO address range in the memory at the device.

5. The method of claim 2, further comprising:
   receiving an assignment of the device to a compute element; and
   determining the translation of the hierarchical MMIO address range to the physical MMIO address range for the identifier of the bridge in the south chip in the assignment that matches the identifier of the bridge in the south chip for the physical MMIO address range.

6. The method of claim 1, further comprising:
   calculating the physical MMIO address that is within the physical MMIO address range.

7. The method of claim 6, wherein the calculating further comprises:
   calculating a difference between the hierarchical MMIO address in the transaction and a lower bound of the hierarchical MMIO address range; and adding the difference to a lower bound of the physical MMIO address range.

8. The method of claim 6, wherein the calculating further comprises:
calculating a difference between an upper bound of the hierarchical MMIO address range and the hierarchical MMIO address in the transaction; and
subtracting the difference from an upper bound of the physical MMIO address range.

9. A computer readable storage medium encoded with instructions, wherein the instructions when executed comprise:
writing, to a north chip, a translation of a hierarchical MMIO address range to a physical MMIO address range and an identifier of a bridge in a south chip, wherein the physical MMIO address range specifies a range of physical MMIO addresses in memory in a device;
receiving a transaction comprising a hierarchical MMIO address;
in response to the receiving, calculating a physical MMIO address that is within the physical MMIO address range and replacing the hierarchical MMIO address in the transaction that is within the hierarchical MMIO address range with the physical MMIO address that is within the physical MMIO address range and with the identifier of the bridge in the south chip, wherein the bridge in the south chip comprises an electronic component that forwards packets of data; and
in response to the replacing, sending the transaction to the bridge in the south chip identified by the identifier in the transaction, wherein the bridge sends the transaction to the device that is connected to the bridge.

10. The computer-readable storage medium of claim 9, wherein the sending the transaction further comprises sending the transaction via a connection mesh fabric that comprises a point-to-point serial link.

11. The computer-readable storage medium of claim 9, further comprising:
reading data that describes the device and the bridge from the south chip; and
in response to the reading, determining the physical MMIO address range and sending the physical MMIO address range to the device, wherein the device stores the physical MMIO address range in the memory at the device.

12. The computer-readable storage medium of claim 9, further comprising:
receiving an assignment of the device to a compute element; and
determining the translation of the hierarchical MMIO address range to the physical MMIO address range for the identifier of the bridge in the south chip in the assignment that matches the identifier of the bridge in the south chip for the physical MMIO address range.

13. The computer-readable storage medium of claim 9, wherein the calculating further comprises:
calculating a difference between the hierarchical MMIO address in the transaction and a lower bound of the hierarchical MMIO address range; and
adding the difference to a lower bound of the physical MMIO address range.

14. The computer-readable storage medium of claim 9, wherein the calculating further comprises:
calculating a difference between an upper bound of the hierarchical MMIO address range and the hierarchical MMIO address in the transaction; and
subtracting the difference from an upper bound of the physical MMIO address range.

15. A computer system comprising:
a compute element comprising a north chip that stores a translation of a hierarchical MMIO address range to a physical MMIO address range and a identifier of a bridge in a south chip, wherein the physical MMIO address range specifies a range of physical MMIO addresses in memory in a device, wherein the north chip receives a transaction comprising a hierarchical MMIO address, in response to the transaction, the north chip calculates a physical MMIO address that is within the physical MMIO address range and replaces the hierarchical MMIO address in the transaction that is within the hierarchical MMIO address range with the physical MMIO address that is within the physical MMIO address range and with the identifier of the bridge, and the north chip sends the transaction to the bridge in the south chip identified by the identifier in the transaction, wherein the bridge in the south chip comprises an electronic component that forwards packets of data; and
an input/output element connected to the compute element via a connection mesh fabric, wherein the input/output element comprises the bridge, wherein the bridge receives the transaction and sends the transaction to the device that is connected to the bridge.

16. The computer system of claim 15, wherein the connection mesh fabric comprises a point-to-point serial link, and wherein the north chip sends the transaction to the bridge via the point-to-point serial link.

17. The computer system of claim 15, further comprising:
a first service processor comprising an inventory controller, wherein the first service processor is connected to the input/output element via a communications link, wherein the inventory controller reads the identifier of the bridge and an identifier of the device from the input/output element and in response determines the physical MMIO address range and sends the physical MMIO address range to the device, wherein the device stores the physical MMIO address range in the memory at the device.

18. The computer system of claim 17, further comprising:
a second service processor connected to the first service processor, wherein the second service processor comprises a management entity that receives an assignment of the device to the compute element and determines the translation of the hierarchical MMIO address range to the physical MMIO address range for the identifier of the bridge in the south chip in the assignment that matches the identifier of the bridge in the south chip for the physical MMIO address range.

19. The computer system of claim 15, wherein the north chip further:
calculates a difference between the hierarchical MMIO address in the transaction and a lower bound of the hierarchical MMIO address range; and
adds the difference to a lower hound of the physical MIMO address range.

20. The computer system of claim 15, wherein the north chip further:
calculates a difference between an upper bound of the hierarchical MMIO address range and the hierarchical MMIO address in the transaction; and
subtracts the difference from an upper bound of the physical MMIO address range.

* * * * *